(12) United States Patent
Griffin et al.

(10) Patent No.: US 8,350,729 B2
(45) Date of Patent: *Jan. 8, 2013

(54) REDUCED QWERTY KEYBOARD SYSTEM THAT PROVIDES BETTER ACCURACY AND ASSOCIATED METHOD

(75) Inventors: Jason Tyler Griffin, Kitchener (CA); Mihal Lazaridis, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/286,046

(22) Filed: Oct. 31, 2011

(65) Prior Publication Data

US 2012/0062466 A1  Mar. 15, 2012

Related U.S. Application Data

(60) Division of application No. 11/859,224, filed on Sep. 21, 2007, now Pat. No. 8,072,355, which is a continuation of application No. 11/188,307, filed on Jul. 25, 2005, now Pat. No. 7,312,410.

(51) Int. Cl.
*H03M 11/00* (2006.01)
(52) U.S. Cl. .......................... 341/22; 200/5 E; 400/472
(58) Field of Classification Search ............... 200/5 E; 341/22; 379/433.07; 400/472
See application file for complete search history.

(56) References Cited

U.S. PATENT DOCUMENTS

| | | | |
|---|---|---|---|
| 5,528,235 A | 6/1996 | Lin et al. | |
| 5,824,978 A | 10/1998 | Karasik et al. | |
| 5,861,823 A | 1/1999 | Strauch et al. | |
| 6,080,941 A | 6/2000 | Yokobori | |
| 6,307,548 B1 * | 10/2001 | Flinchem et al. | 715/811 |
| 6,377,685 B1 | 4/2002 | Krishnan | |
| 6,452,588 B2 | 9/2002 | Griffin | |
| 6,489,950 B1 | 12/2002 | Griffin | |
| 6,931,125 B2 | 8/2005 | Smallwood | |
| 6,995,326 B2 | 2/2006 | Sugimura et al. | |
| 7,014,099 B2 | 3/2006 | Crisan | |
| 7,109,973 B2 | 9/2006 | Fyke et al. | |
| 7,312,410 B2 * | 12/2007 | Griffin et al. | 200/5 A |
| 7,391,861 B2 | 6/2008 | Levy | |
| 8,072,355 B2 * | 12/2011 | Griffin et al. | 341/22 |
| 2001/0006587 A1 | 7/2001 | Keinonen et al. | |
| 2002/0188448 A1 * | 12/2002 | Goodman et al. | 704/254 |

FOREIGN PATENT DOCUMENTS

DE  3715765 A1  12/1988

(Continued)

*Primary Examiner* — Albert Wong
(74) *Attorney, Agent, or Firm* — Novak Druce + Quigg LLP

(57) ABSTRACT

A handheld electronic device and an associated method are provided. The handheld electronic device includes a keyboard assembly, a display positioned adjacent the keyboard assembly, a processor structured to receive inputs from the keyboard assembly and to output to the display as a function of the inputs, the processor further structured to run a disambiguation routine. The keyboard assembly includes a printed circuit board, a primary conductor portion, a secondary conductor portion, and a keyboard assembly. The printed circuit board has a plurality of electrical contacts. The conductor assembly has a plurality of primary conductors and a plurality of secondary conductors, each the primary conductor and secondary conductor structured to correspond to, and engage and close, at least one of the plurality of electrical contacts. The keyboard assembly has a plurality of keys each having one or more indicia thereon.

18 Claims, 11 Drawing Sheets

FOREIGN PATENT DOCUMENTS

| | | |
|---|---|---|
| EP | 0930760 A2 | 7/1999 |
| EP | 1400889 A2 | 3/2004 |
| EP | 1515527 A1 | 3/2005 |
| JP | 2003241885 A | 8/2003 |
| WO | 9915952 A2 | 4/1999 |
| WO | 0167720 A2 | 9/2001 |

* cited by examiner

REDUCED QWERTY KEYBOARD SYSTEM THAT PROVIDES BETTER ACCURACY AND ASSOCIATED METHOD

CROSS-REFERENCE TO RELATED APPLICATIONS

This application is a divisional of U.S. application Ser. No. 11/859,224, filed Sep. 21, 2007 now U.S. Pat. No. 8,072,355, which is a continuation of U.S. application Ser. No. 11/188,307, filed July 25, 2005 and which issued as U.S. Pat. No. 7,312,410. U.S. application Ser. Nos. 11/859,224 and 11/188,307 are both incorporated by reference herein in their entireties.

BACKGROUND OF THE INVENTION

1. Field of the Invention

This application relates to handheld electronic devices and, more particularly, to a keyboard for a handheld electronic device having a first set of keys structured to engage two contacts and a second set of keys structured to engage a single contact and wherein each key in said first set of keys and said second set of keys is related to two indicia.

2. Background Information

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable and thus must be relatively small. Since handheld electronic devices typically are portable, it is also desired that the form factor of the devices be sufficiently small and ergonomic that they can conveniently be transported with a belt clip, in a user's pocket, manually, or in a briefcase. Advancements in technology have permitted the form factor of such handheld electronic devices to be reduced while increasing their versatility and functionality, such as by increasing the number of functions provided by the device as well as increasing the number of software applications and the variety of their features. However, as the form factor of a handheld electronic device decreases and the number of functions provided by the device increases, the device potentially can become awkward and difficult to use. Thus, it is also desirable to improve the usability of a handheld electronic device, as its form factor is reduced and its versatility is increased. Previous attempts to increase such usability have had limitations.

One such type of solution has involved the use of large numbers of keys which, when pressed in various combinations, would produce various functions. For instance, adjacent keys were depressed simultaneously to provide additional functions. In mobile electronics, keys oftentimes are operatively connected with metal domes that act as switches for the keys and that are collapsible and provide tactile feedback to a user when the domes are collapsed from a relaxed position to a deflected position. Due to the closeness of the keys, accidental simultaneous pressing of multiple keys oftentimes results in the collapsing of multiple domes, which can result in a confusing and/or undesirable tactile feedback to a user. Other attempts at improving usability have involved decreasing the quantity of keys on a handheld device while increasing the number of functions each key is to serve. Such systems potentially can become cumbersome because the various functions of a given key may additionally require the pressing of an additional key, such as, but not limited to, the SHIFT key or ALT key. In such a circumstance, the required multiple key pushing requires multiple hand movements which interfere with user friendliness.

It is also desirable to provide users with keys disposed in a common pattern. For example, an English language keyboard typically has the QWERTY layout, Thus, handheld electronic devices having a QWERTY keyboard with a reduced number of keys have been created. Such devices typically have more that one letter associated with most keys. For example, a single key on the QWERTY keyboard with a reduced number of keys would represent both the letter "A" and the letter "S". Thus, the handheld electronic device needed to provide a means for selecting which letter the user intended to select When the key was depressed. An early differentiating means simply had the user depressing the key once for one letter and twice for the other letter. Alternatively, as described above, a combination of keys could be associated with one letter and not the other. That is, for example, the key by itself was associated with the letter "A" and the key plus the ALT key was associated with the letter "S." The disadvantage to these means is that users of a QWERTY keyboard prefer to type in a traditional manner, i.e., without having to depress an extra key.

One means of addressing this disadvantage was provided by software. Disambiguation routines were created that suggested one of the letters based on, for example, a subsequent keystroke. That is, if the user had selected the letters "QU" and the next key depressed was the "A/S" key, the software would suggest the use of the letter "A" because the letter combination "QU" is almost always followed by a vowel. Such software solution would typically provide the user with a list of the less preferred letter combinations which the user could select if desired. This means was further improved by providing three conductors, a primary, secondary and tertiary conductor, under each key and Which were operable with the software, The primary conductor was engaged when the key was depressed. The secondary and tertiary conductors were disposed adjacent to opposing lateral sides of the keys and were alternately closed when the user depressed one side of the key or the other. Thus, where the letter "A" was located on the left side of a single key, and the secondary conductor was located under the left lateral side of the key, when a user depressed the "A/S" key and pressed on the left side of the key, the primary conductor was engaged indicating the key had been depressed and, if the secondary conductor was depressed, the software would weigh, that is favor, the letter "A" over the letter "S".

This solution, however, has disadvantages as well. For example, some keys may only be associated with a single letter thereby making the secondary and tertiary conductors redundant. Also, some keys, such as a "Z/X" key have letters that are so relatively uncommon in use that the software could reliably choose the proper letter the user intended to use. Again, the secondary and tertiary conductors were essentially wasted. Additionally, where each key was structured to overlay three conductors, all keys were elongated resulting in a wider keypad.

SUMMARY OF THE INVENTION

These disadvantages are overcome by the present invention which provides a keyboard structured to be incorporated into a handheld electronic device and a method of enabling input into a handheld electronic device having a first set of elongated keys structured to engage at least two electrical contacts and a second set of keys structured to engage a single contact. There is a cost savings associated with reducing the number of metal domes required and the keyboard may be more narrow that the prior art keyboard given that only selected keys are elongated.

The first set of keys are elongated in a lateral direction and, in one embodiment, are structured to engage a primary contact, a secondary contact and a tertiary contact. The secondary contact and tertiary contact are disposed under the lateral sides of the keys in the first group. Thus, when one side of a key in the first group is pressed, both the primary contact and either the secondary contact or tertiary contact is depressed. The keyboard is coupled to a processor running a disambiguation routine. When the secondary contact or tertiary contact is engaged, the indicia associated with that contact is favored, or weighted, in the disambiguation routine. The program subsequently causes a list of indicia combinations to be displayed with the favored combinations at the top of the list.

The method of interacting with such a keyboard includes the steps of detecting a first input from a key on the keypad, determining whether the first input resulted from engaging a secondary conductor, and outputting a list of indicia corresponding to the indicia on the key and, where a secondary conductor was engaged, favoring outputting the indicia corresponding to the indicia associated with the secondary conductor by placing the indicia corresponding to the indicia associated with the secondary conductor on the top of the list.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As used herein, the word "assigned" when used in association with indicia on a key indicates that the indicia is printed on a key and that the processor/software is programmed to associate the indicia with key having the indicia printed thereon.

As used herein the words "indicia" and "character" indicates any language element such as, but not limited to, a letter, number, ideogram, a space, or punctuation mark. For the sake of differentiation, "indicia" is used in relation to a fixed mark on a key and "character" is used in relation to an image created on a display.

Figure 1:
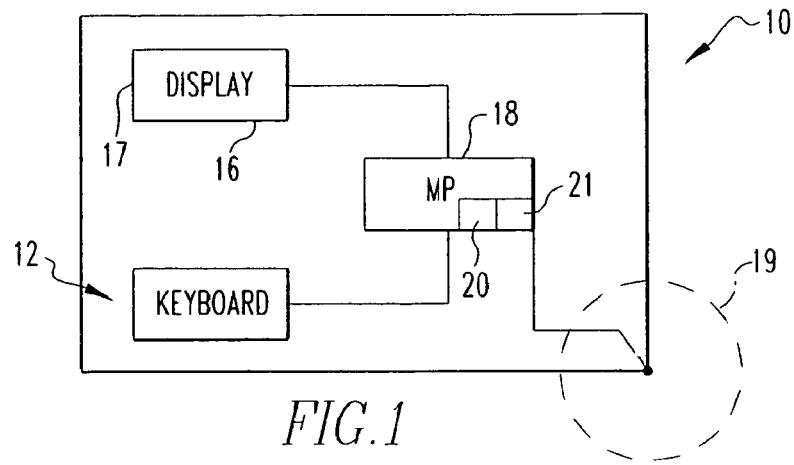
FIG. 1 is a block diagram of an improved handheld electronic device in accordance with the invention.

A handheld electronic device 10 is shown schematically in FIG. 1. Generally, the handheld electronic device 10 includes a keyboard assembly 12, a housing assembly 14, an output device. 16, such as but not limited to, a display 17, and a suitable processor 18 (e.g., without limitation, a microprocessor) having software 20. The software 20 preferably resides in the handheld electronic device 10 and provides functionality to inputs received from the keyboard assembly 12 and provides outputs to the output device 16. The software 20 further includes a disambiguation routine 21, as described below. The keyboard assembly 12 and the output device 16 are disposed on the housing assembly 14, and the operability of the software 20 is enabled by the processor 18. The handheld electronic device 10 may also include an electronic selection device such as, but not limited to, a wheel or dial 19. The dial 19 may be engaged by a user and is structured to provide a selective input corresponding with a rotation of the dial 19. The dial 19 is in electronic communication with the processor 18. Examples of handheld electronic devices are included in U.S. Pat. Nos. 6,452,588 and 6,489,950, which are incorporated by reference herein.

Generally, as described in detail below, the keyboard assembly 12 is structured to be incorporated into the handheld electronic device 10. The keyboard assembly 12 includes a printed circuit board 78 having a plurality of electrical contacts 102, 106, a conductor assembly 71 having a plurality of primary conductors 89, a plurality of secondary conductors 96, a plurality of tertiary conductors 97, and a key pad assembly having a plurality 30 of keys 32 each having one or more indicia 34 assigned thereto. Each primary conductor 89 and secondary conductor 96 are structured to correspond to, and engage and close, at least one of said plurality of electrical contacts 102, 106. The plurality 30 of keys 32 is disposed in at least a first set 40 of keys 42 and a second 60 set of keys 62, wherein at least two keys 42 in the first set 40 are each coupled to, and structured to engage, a first number of conductors 89, 96, 97 and each key 62 in the second set 60 is coupled to, and structured to engage, a second number of conductors 89, 96, 97, wherein the first and second number of conductors 89, 96, 97 is different. For example, each key 42 in the first set 40 may be coupled to, and structured to engage, a primary conductor 89 and at least one secondary conductor 96, and, each key 62 in the second set 60 may be coupled to, and structured to engage, only a primary conductor 89. Additionally, at least two keys 42 in the first set 40 are each structured to engage at least one tertiary conductor 97.

Figure 2:
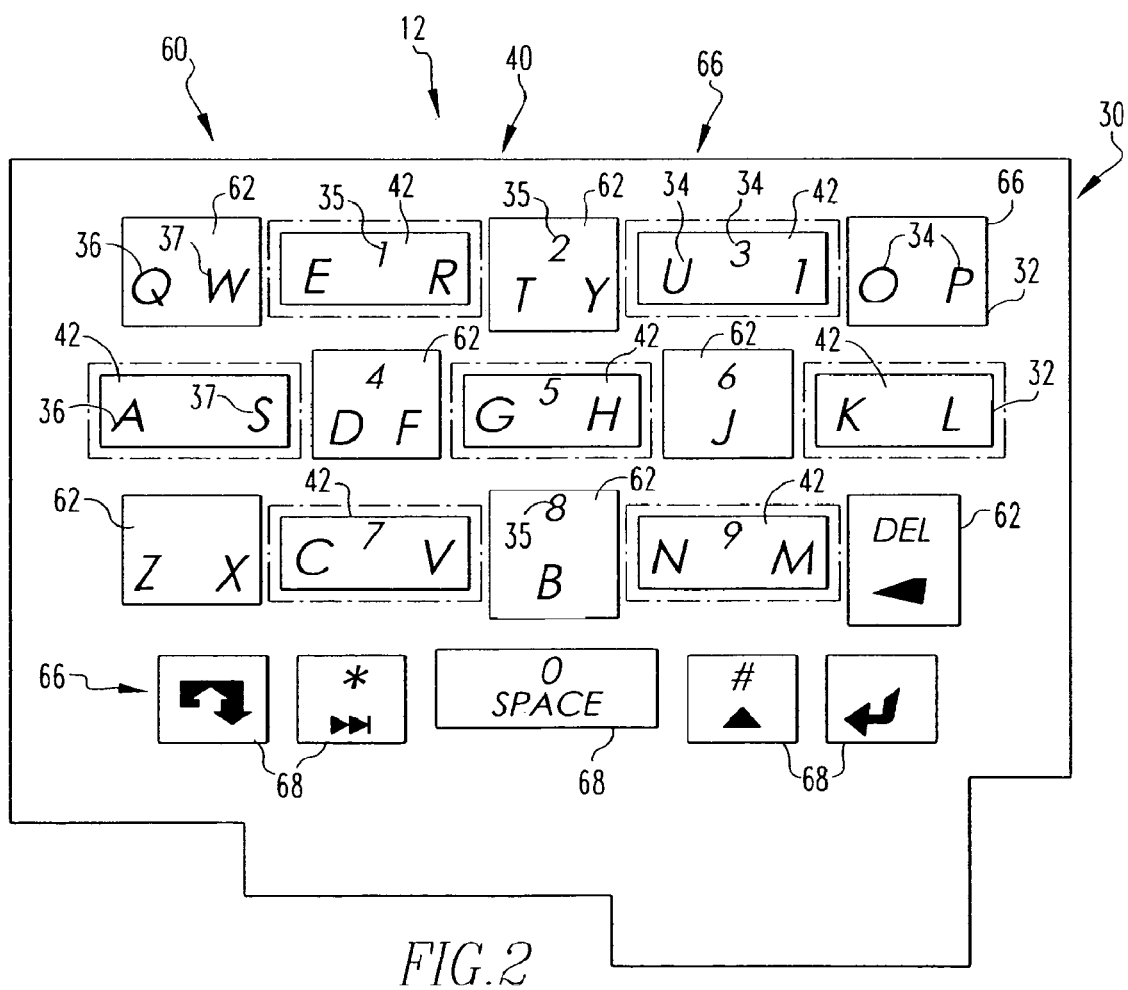
FIG. 2 is a top plan view of a keyboard in accordance with the invention.

As can be seen in FIG. 2, the exemplary keyboard assembly 12 includes a plurality 30 of keys 32. Each key 32 includes at least one indicium 34 visible thereon. The plurality 30 of keys 32 includes at least a first set 40 of keys 42 and a second set 60 of keys 62. Each set of keys 40, 60 has at least two keys. In addition to other differences, as will be discussed in more detail below, the keys 42 of the first set 40 have a different shape than the keys 62 of the second set 60. Preferably, the keys 42 of the first set 40 appear laterally elongated relative to the keys 62 of the second set 60. The appearance of elongation may be accomplished by having the keys 42 of the first set 40 being generally rectangular and by having the keys 62 of the second set 60 having a generally square shape. Additionally, the keys 42 of the first set 40 may be longer in a lateral direction than the keys 62 of the second set 60. There may also be a third set 66 of keys 68 that, for reasons set forth below, operate in a manner different than the keys 42, 62 of the first and second sets 40, 60.

The indicia 34 may be divided into first indicia 35, second indicia 36 and third indicia 37. As shown, many of the exemplary first indicia 35 are digits, and many of the second and third indicia 36 and 37, respectively, are letters. While not limiting on the claims, but as shown in FIG. 2 and for the purpose of the following description, the first indicia 35 are disposed on a key 42, 62, 68 at a location above the second and third indicia 36 and 37. Further, the second indicia 36 are disposed on the left side of a key 42, 62 and the third indicia 37 are disposed on the right side of a key 42, 62, Also, many of the second and third indicia 36, 37 are in the pattern of a QWERTY keyboard. It is understood, however, that the arrangement of the indicia 34 can be different than the exemplary arrangement depicted in FIG. 2. For instance, the first, second, and third indicia 35, 36 and 37, respectively, can together form a QWERTY arrangement. Alternately, the indicia 34 could be numerical or mathematical symbols, could be characters of different languages, or could be of virtually any other character and/or keyboard configuration.

Figure 3:
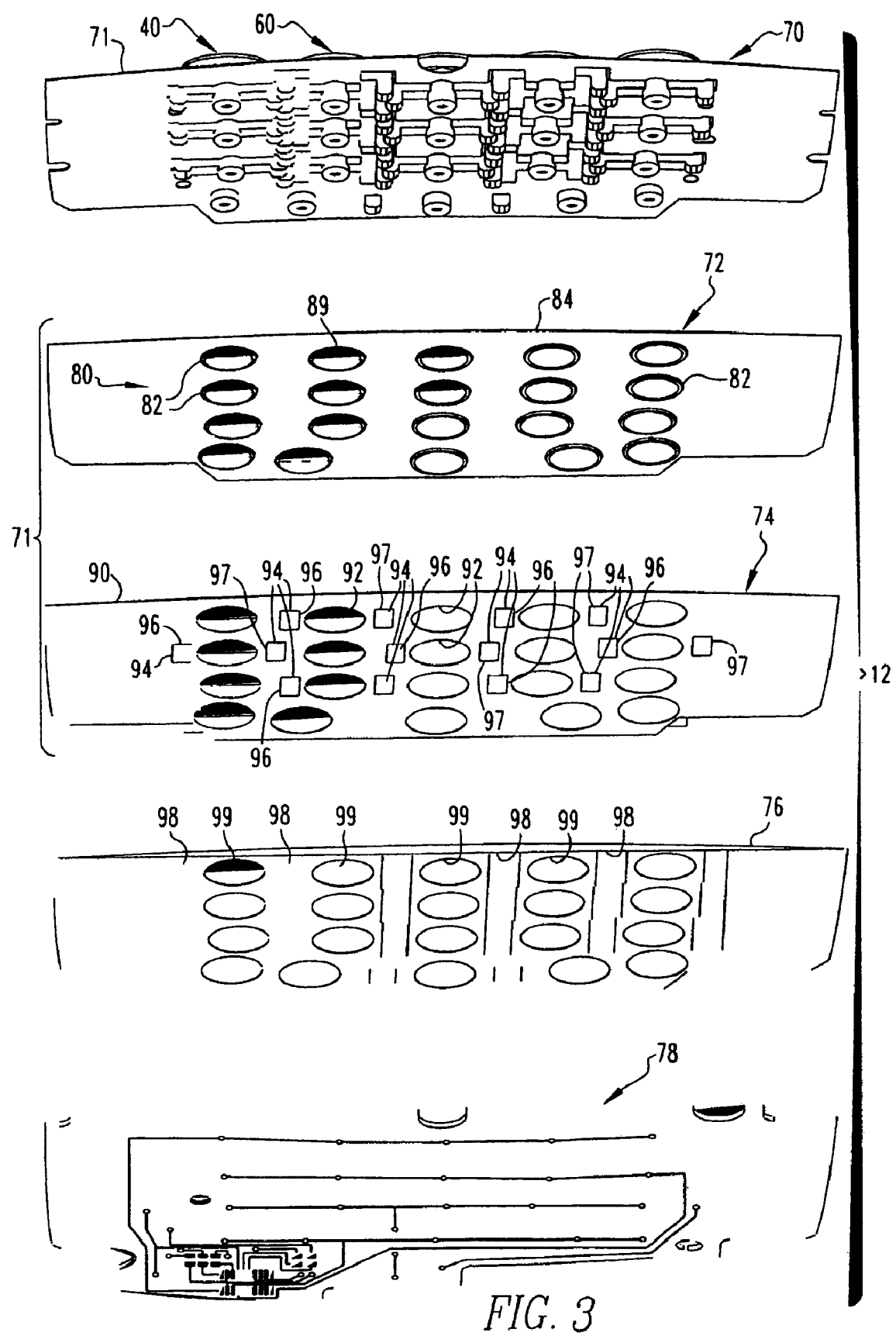
FIG. 3 is an exploded isometric view of the keyboard of FIG. 2.
Figure 4:
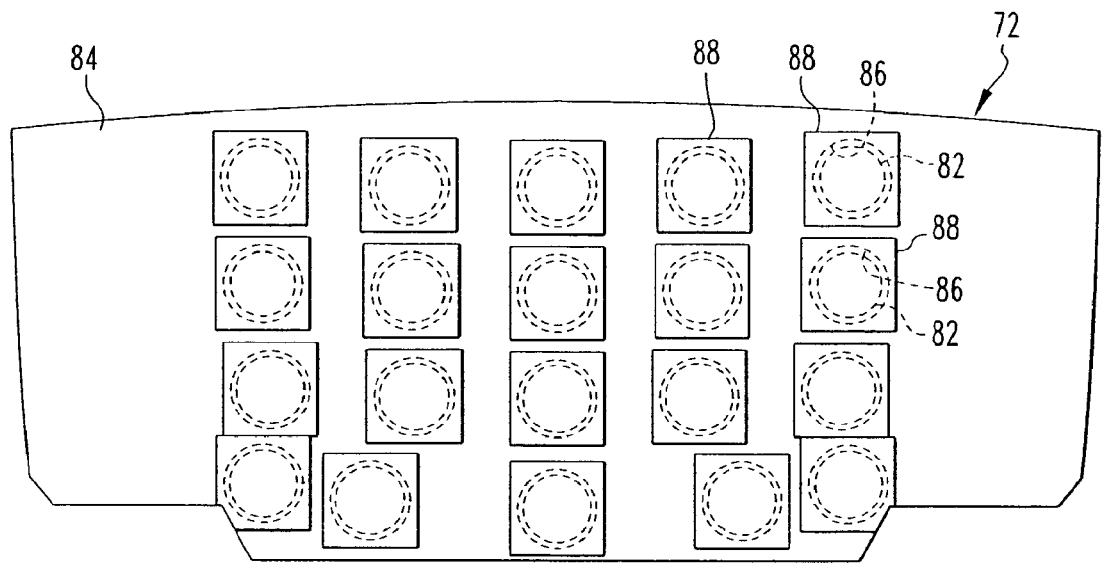
FIG. 4 is a top plan view of the primary conductor portion of the keyboard of FIG. 2.

As can be best understood from FIG. 3, the keyboard assembly 12 includes a keypad 70, a conductor assembly 71 having a primary conductor portion 72 and a secondary conductor portion 74, a spacer 76, and a printed circuit board 78. The aforementioned components of the keyboard assembly 12 can be adhered together or otherwise attached to one another, while in other embodiments the components need not be adhered to one another in any fashion.

The keypad 70 includes the aforementioned sets of keys 40, 60, 68 and a key panel 73. The keys 42, 62, 68 are movably disposed on the key panel 73 and are permitted to pivot slightly with respect thereto.

The primary conductor portion 72 includes a plurality 80 of conductive domes 82 disposed on a dome panel 84. The dome panel 84 includes a plurality of primary holes 86 (FIG. 8) formed therein and a plurality of flexible adhesive members 88 (FIG. 8) disposed on one surface of the dome panel 84 and positioned adjacent the plurality of primary holes 86. The domes 82 extend through the plurality of primary holes 86, and the apex of each dome 82, i.e., the proud portion thereof, is adhered to one of the adhesive members 88. The circular edge of each dome 82 opposite the apex thereof protrudes outwardly from and beyond the associated plurality of primary hole 86. While in the depicted exemplary embodiment the domes 82 are adhered to the dome panel 84 with the adhesive members 88, it is understood that in other embodiments the domes 82 and the dome panel 84 may be connected together in other fashions, or might not be connected together at all, without departing from the concept of the invention. The domes 82 are elastically deflectable between a relaxed position, i.e., FIG. 8, and a deflected position, i.e., FIGS. 9-11. The movement of the domes 82 between the relaxed and deflected positions occurs via elastic deformation of the domes 82 and causes the domes 82 to "snap" between the relaxed and deflected conditions to provide a desirable tactile feedback. The domes 82 are positioned to he disposed below an associated key 42, 62, 68. As assembled, each dome 82 and other associated components acts as a primary conductor 89.

The secondary conductor portion 74 includes a plurality of conductive carbon patches 94 disposed on a flexible support sheet 90. The support sheet 90 includes a plurality of primary holes 98 formed therein and positioned to be disposed below an associated key 42, 62, 68. That is, the primary holes 98 in the support sheet 90 are arranged to correspond with and be similar to the arrangement of the primary holes 98 in the dome panel 84. In the preferred embodiment, the carbon patches 94 are positioned to be located on each lateral side of a primary hole 98 associated with a key 42 from the first set 40. The carbon patches 94 located to the left side of a secondary conductor portion 74 primary hole 98 is hereinafter a secondary conductor 96 and the carbon patches 94 located to the right side of a secondary conductor portion 74 primary hole 98 is hereinafter a tertiary conductor 97. It is understood that in other embodiments the secondary conductor portion 74 could have patches of a different conductive material, such as a metal or other material, without departing from the concept of the invention. The support sheet 90 may be a thin plastic sheet, although other configurations are possible.

It is understood that the primary conductor portion 72 and the secondary conductor portion 74 can be said to provide switches for the keys 42, 62, 68, Such switches of the primary conductor portion 72 provide a tactile feedback, and such switches of the secondary conductor portion 74 generally do not provide tactile feedback, but such switches could be of other configurations.

The spacer 76 is a sheet of material that can be generally said to space the carbon patches 94 away from the printed circuit board 78. The spacer 76 includes a plurality of circular primary holes 99 arranged in rows similar to the arrangement of the primary holes 98 in the support sheet 90 and the primary holes 86 in the dome panel 84. The spacer 76 additionally includes a plurality of elongated secondary holes 101 that correspond generally with the arrangement of the carbon patches 94 on the support sheet 90. In the exemplary embodiment, the spacer 76 is a thin sheet of an insulative material, such as plastic, although configurations are possible. It is also understood that the keyboard assembly 12 potentially could be configured in other fashions that would eliminate the need for the spacer 76 but would still be considered. to be within the scope of the invention.

Figure 7:
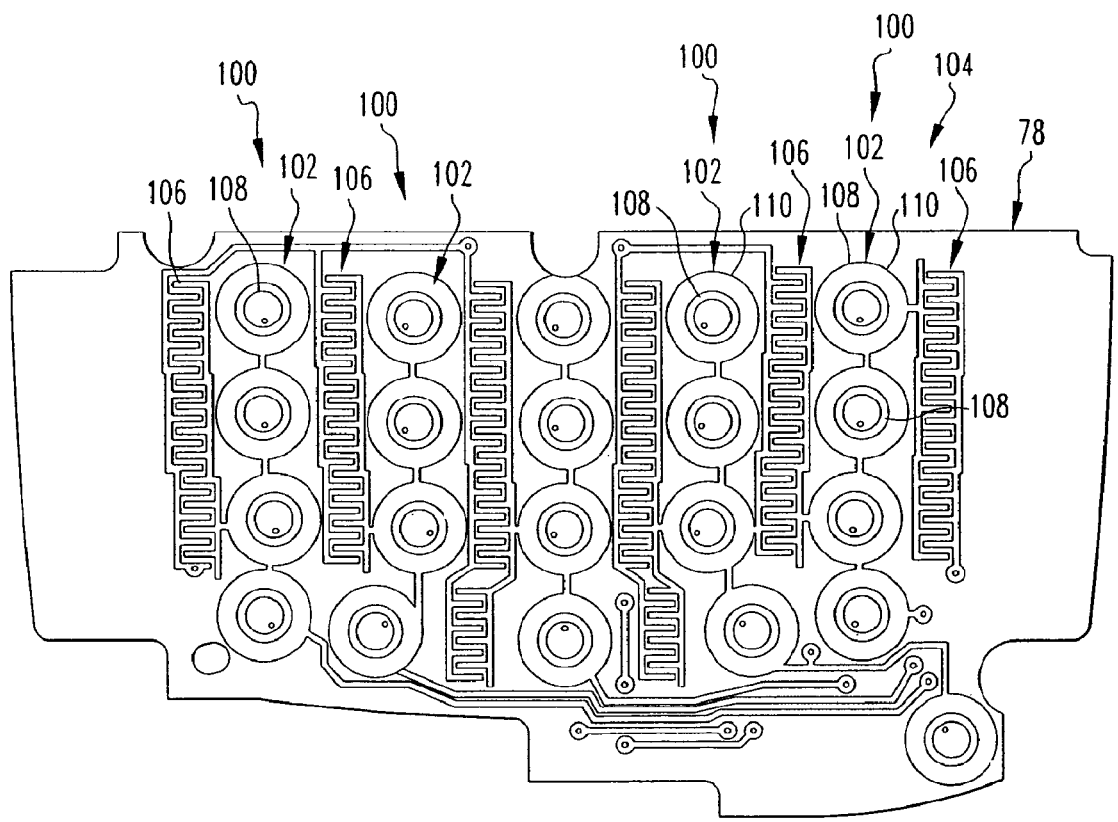
FIG. 7 is a top plan view of the printed circuit board of the keyboard of FIG. 2.
Figure 7A:
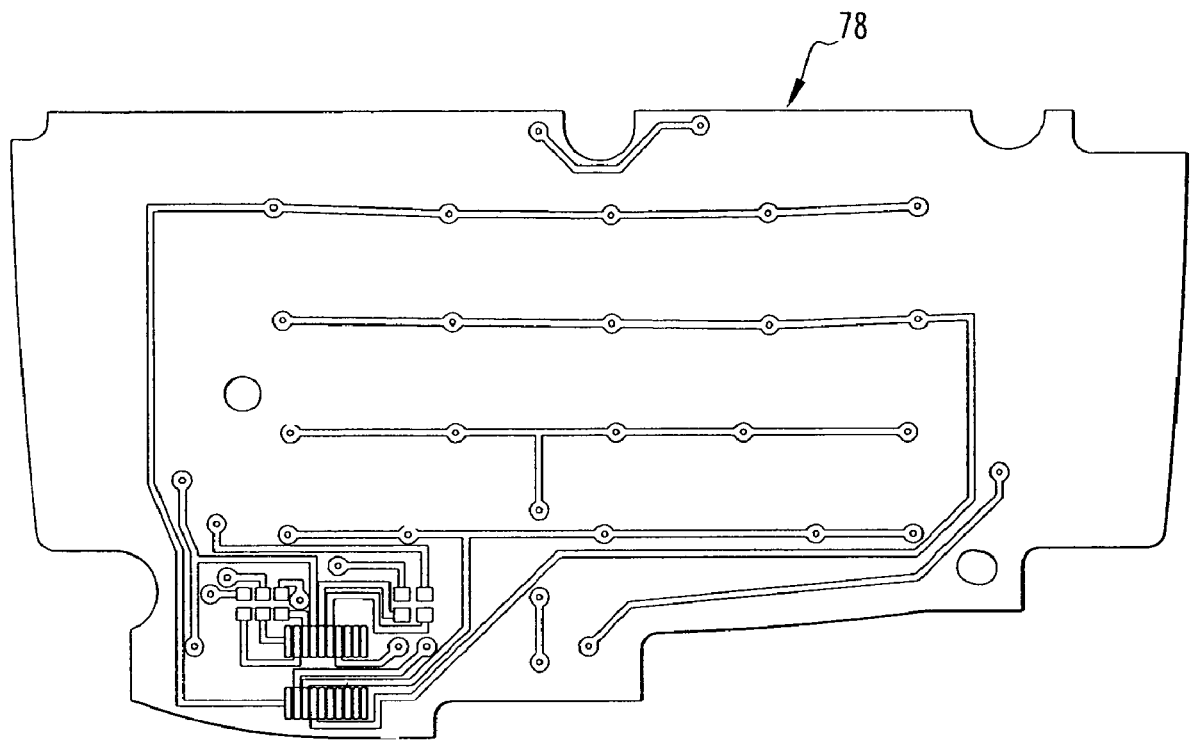
FIG. 7A is a bottom plan view of the printed circuit board of the keyboard of FIG. 2.

As is best shown in FIG. 7, the printed circuit board 78 includes a plurality 100 of primary contacts 102 and a plurality 104 of secondary contacts 106. The primary and secondary contacts 102 and 106, respectively, are electrically conductive electrical contacts which, when connected with one another, such as with a conductor extending therebetween, completes a circuit or completes an open portion of a circuit. The circuits formed by the primary and secondary contacts 102, 106 are in electrical communication with the processor 18. The primary contacts 102 are, in the depicted exemplary embodiment, arranged in pairs and specifically include a ball contact 108 and a ring contact 110, with the ring contact 110 extending concentrically about the ball contact 108.

The domes 82 (FIG. 8) each also extend through an aligned pair of the primary holes 98, 99 formed in the support sheet 90 and the spacer 76, respectively. The circular ends of the domes 82 rest on the ring contacts 110 of the primary contacts 102. The secondary contacts 106 are arranged in pairs and are generally of an "intermeshed comb" arrangement. In the exemplary embodiment of the printed circuit board 78 depicted in FIG. 7 and described herein, certain of the primary contacts 102 are electrically connected with leads to certain of the secondary contacts 106, and numerous other contact configurations are possible without departing from the concept of the invention.

As can be understood from FIGS. 8-11, each key 42 in the first set 40 includes a finger plate 120, a first protrusion 122 in the exemplary form of a hollow cylinder, a second protrusion 124, and a third protrusion 126. The finger plate 120 is engageable by a user's finger and includes the indicia 34 (FIG. 2) disposed thereon. The first, second, and third protrusions 122, 124, and 126, respectively, extend outwardly away from the finger plate 120 in a common direction which, in the exemplary embodiment, is opposite the indicia 34. In the exemplary key 42 of FIGS. 8-11, the free ends of the first, second, and third protrusions 122, 124, and 126, respectively, do not lie within a plane and may be of configurations other than that depicted herein, depending upon the configuration of the other components of the keyboard assembly 12.

Figure 8:
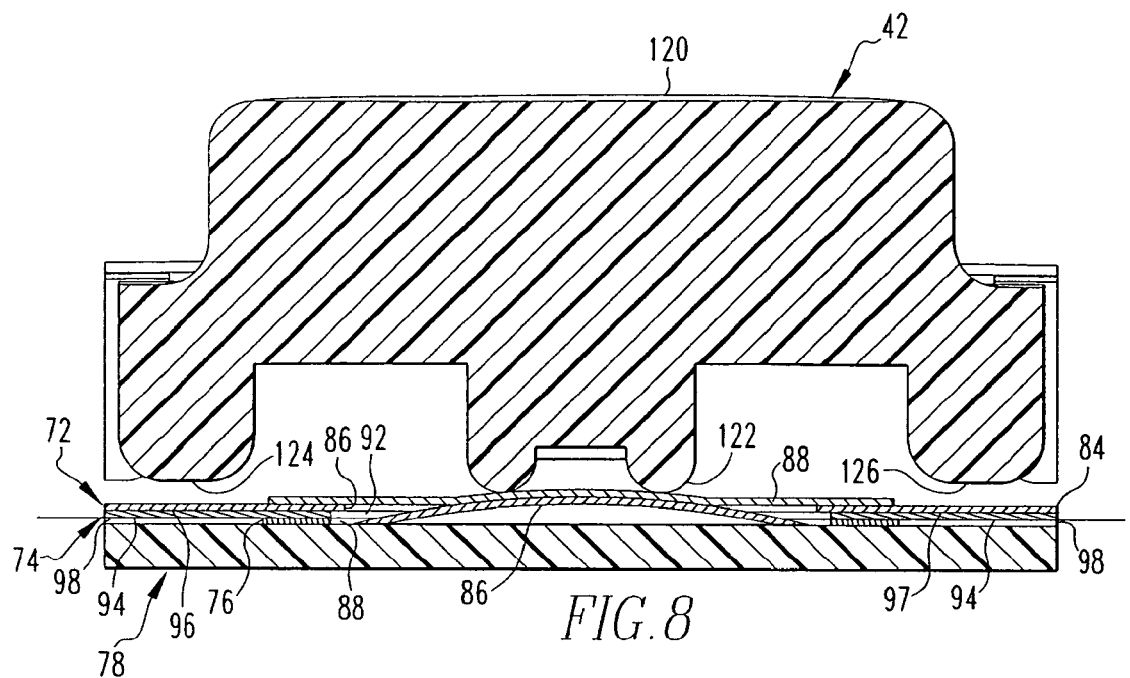
FIG. 8 is a sectional view as taken along Line 8-8 of FIG. 2 and depicting a key from the first set of the keyboard in an initial position.
Figure 9:
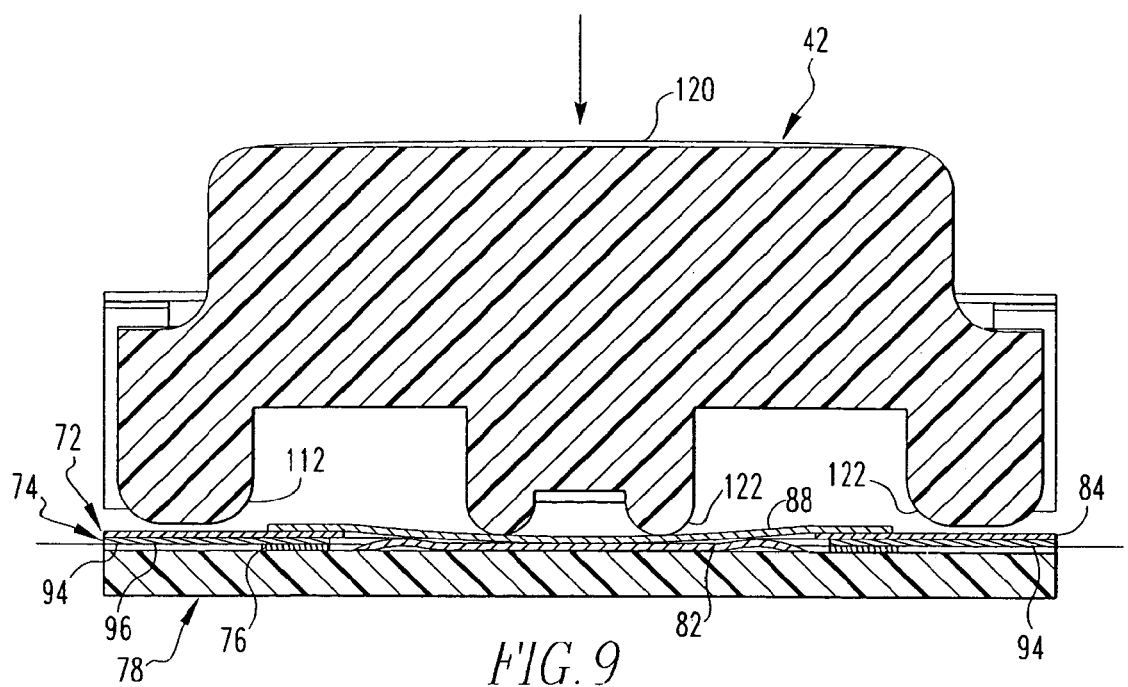
FIG. 9 is a view similar to FIG. 8, except depicting the key in the first terminal position.

As can further be understood from FIG. 8, each key 42 is associated with one of the domes 82 and with a pair of the carbon patches 94 (FIG. 3) wherein one carbon patch 94 is a secondary conductor 96 and the other carbon patch 94 is a tertiary conductor 97. In FIG. 8, the key 42 is in an initial position which corresponds with the relaxed position of the associated dome 82 and the relaxed positions of the associated carbon patches 94. When the key 42 is depressed straight toward the printed circuit board 78, hereinafter "downwardly," such as is depicted generally in FIG. 9, and which would correspond with a user pressing the key 42 at the first indicia 35 (FIG. 2), the first protrusion 122 of the key 42 engages the dome 82 that is associated with the key 42 and elastically collapses the dome 82 to the deflected position, while the carbon patches 94 associated the dome 82 remain in their relaxed positions. The key 42. in FIG. 9 is in the first terminal position, and thus it can be seen that the key 42 is movable between the initial position and the first terminal position.

When the dome 82 is in the deflected position, it contacts the ball contact 108 of the associated pair of primary contacts 102. The domes 82 are primary conductors 89 which, when engaged with a corresponding set of primary contacts 102, electrically connect together the pair of primary contacts 102 in order to complete a circuit or to complete an open portion of a circuit, which provides a first function associated with the first terminal position of the key 42. The dome 82 is configured to "snap" when moving between the relaxed position (FIG. 8) and the deflected position (FIG. 9), and such a "snap" provides a desirable tactile feedback to the user.

Figure 10:
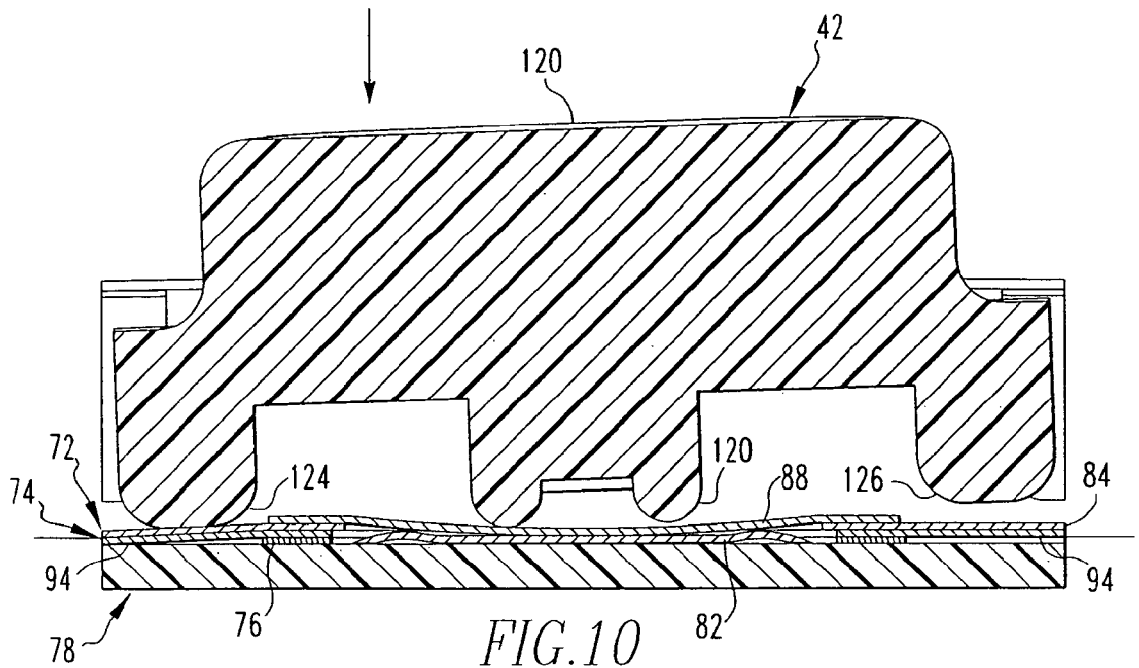
FIG. 10 is a view similar to FIG. 8, except depicting the key in the second terminal position.
Figure 11:
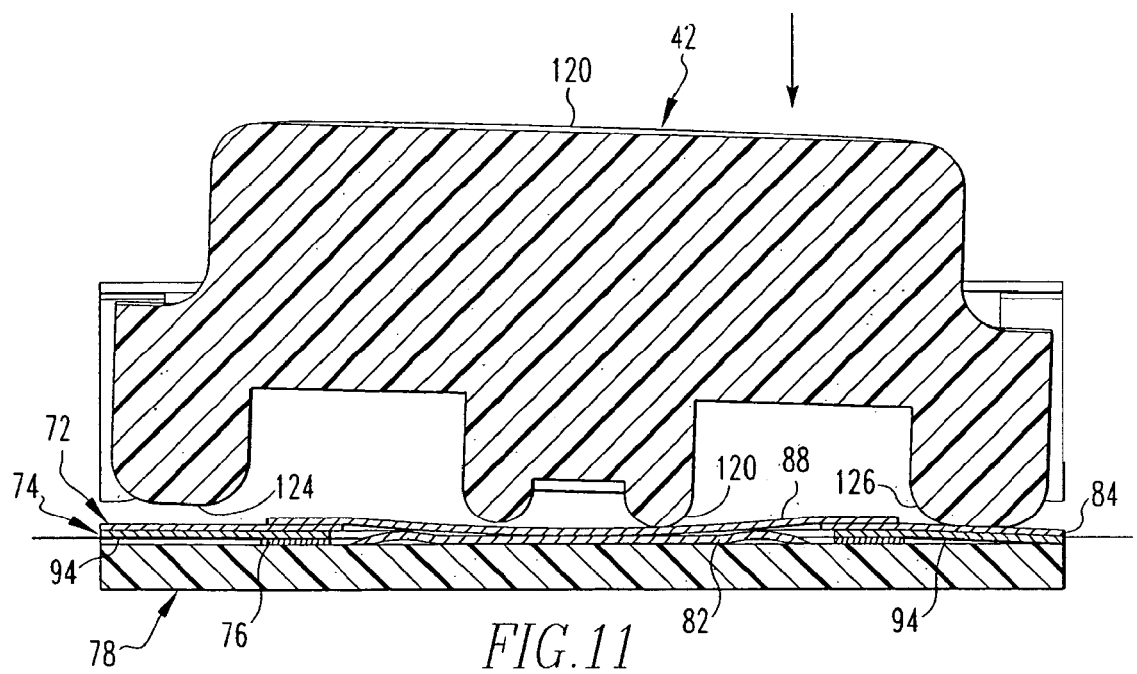
FIG. 11 is a view similar to FIG. 8, except depicting the key in the third terminal position.

As can be understood from FIGS. 10 and 11, the key 42 is also movable between the initial position and the second terminal position, i.e., FIG. 10, that would correspond with a user pressing the second indicia 36 (FIG. 2), which provides the key 42 with a second function associated with the second terminal position of the key 42. The key 42 is also movable between the initial position and the third terminal position, i.e., FIG. 11, which would correspond with a user pressing the third indicia 37 (FIG. 2) of the key 42 to provide the key with a third function associated with the third terminal position of the key 42.

When the key 42 is in the second terminal position, i.e., FIG. 10, the associated dome 82 is in its deflected position, and the secondary conductor 96 associated with the key 42 is also in its deflected condition. When the key 42 is in the third terminal position, i.e., FIG. 11, the associated dome 82 is in its deflected position, and the tertiary conductor 97 associated with the key 42 is also in its deflected condition. The secondary conductor 96 and tertiary conductor 97 are, independently, engageable with a pair of the secondary contacts 106 for the purpose of electrically connecting together the pair of secondary contacts 106 to complete a circuit or to complete an open portion of a circuit.

Figure 5:
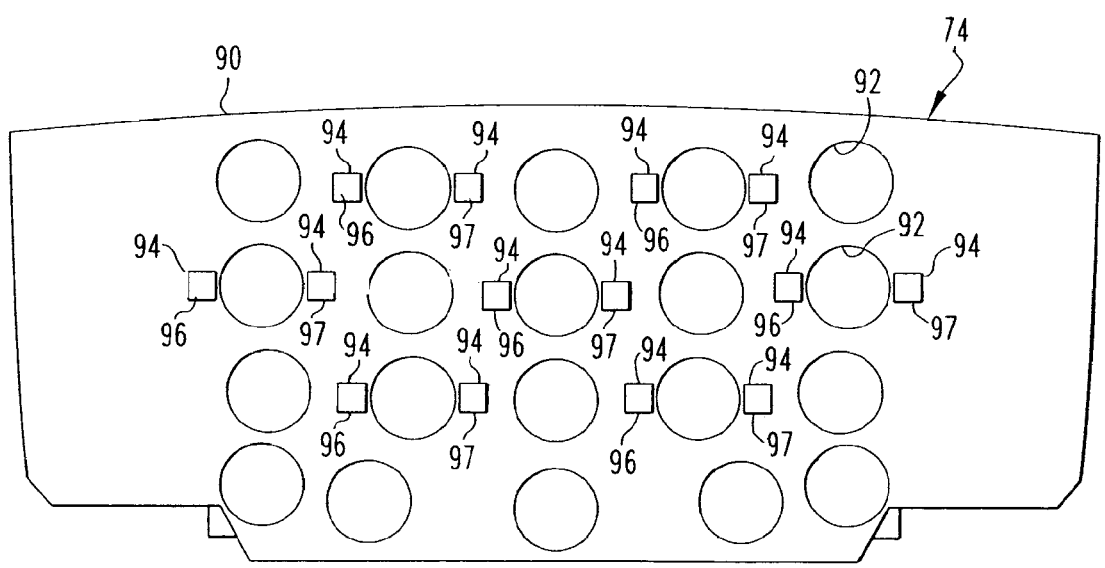
FIG. 5 is a top plan view of the secondary conductor portion of the keyboard of FIG. 2.
Figure 6:
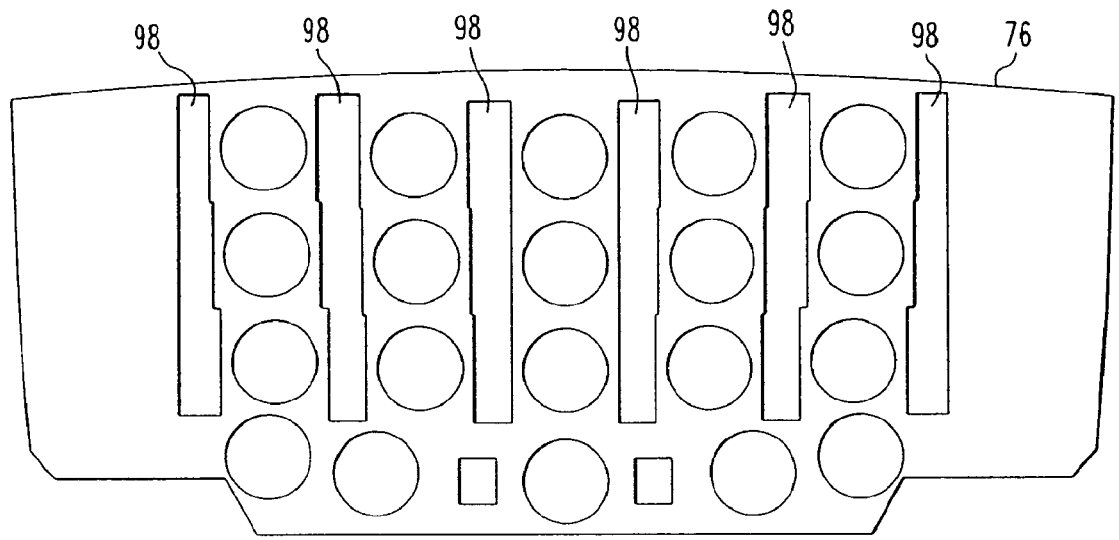
FIG. 6 is a top plan view of the spacer of the keyboard of FIG. 2.

The secondary conductor 96 and tertiary conductor 97 are mounted on the support sheet 90 (FIG. 5), which is flexible, and which permits elastic deflection of the secondary conductor 96 and tertiary conductor 97 between a relaxed position (FIG. 8) and the aforementioned deflected position (FIGS. 10 and 11). The secondary conductor 96 and tertiary conductor 97 in the deflected position extend through the associated secondary holes 101 in the spacer 76 (FIG. 6). In the exemplary embodiment depicted herein the secondary conductor 96 and tertiary conductor 97 do not "snap" or otherwise prove a discrete tactile feedback to the user. Some feedback to the user is acceptable, however, such as the slight additional finger force required to elastically deflect the secondary conductor 96 and tertiary conductor 97 between the relaxed and deflected positions. In other embodiments, the secondary conductor 96 and tertiary conductor 97 can be configured to provide specific tactile feedback to the user in moving between the relaxed and deflected positions without departing from the concept of the invention.

The key 42 in the second terminal position is pivoted slightly in a direction away from the first terminal position. In the exemplary embodiment depicted herein, the second terminal position, i.e., FIG. 10, is pivoted in a counter-clockwise direction from the first terminal position, i.e., FIG. 9, from the perspective of FIGS. 9 and 11. When the key 42 is in the third terminal position, as is depicted in FIG. 11, the associated dome 82 is in the deflected condition. The key 42 in the third terminal position is pivoted in a different direction away from the first terminal position, which direction in the depicted embodiment is a clockwise direction from the first terminal position, i.e., FIG. 9, from the perspective of FIGS. 9 and 11.

When the secondary conductor 96 and tertiary conductor 97 are moved to their deflected positions, which alternately occur at the second and third terminal positions of the key 42, the deflected carbon patch 94 engages an associated pair of the secondary contacts 106 and, being a conductor, electrically connects together the pair of secondary contacts 106. In the embodiment depicted herein, a given pair of the secondary contacts 106 extends along the printed circuit board 78 adjacent a plurality of the pairs of primary contacts 102 and, in the depicted embodiment, the primary contacts 102 of some of the pairs of the primary contacts 102 lie on opposite sides of the given set of secondary contacts 106. Since, in the depicted exemplary embodiment, a single pair of the secondary contacts 106 extends past a plurality of pairs of the primary contacts 102, the single set of secondary contacts 106 serves as the associated secondary contacts 106 for the first set 40 of keys 42 with which the adjacent pairs of primary contacts 102 are associated.

It thus can be seen that each key 42 in the first set 40 of keys 42 is movable between the initial position and a plurality of terminal positions, i.e., the first, second, and third terminal positions, depicted in FIGS. 9-11, respectively. The three terminal positions are associated with the three indicia 35, 36, 37 (FIG. 2) on the keys 42, and the various engagements of the domes 82, the secondary conductor 96 and tertiary conductor 97 provide various inputs to the handheld electronic device 10 and to which the processor 18 and the software 20 provide functionality, as described below.

Figure 12:
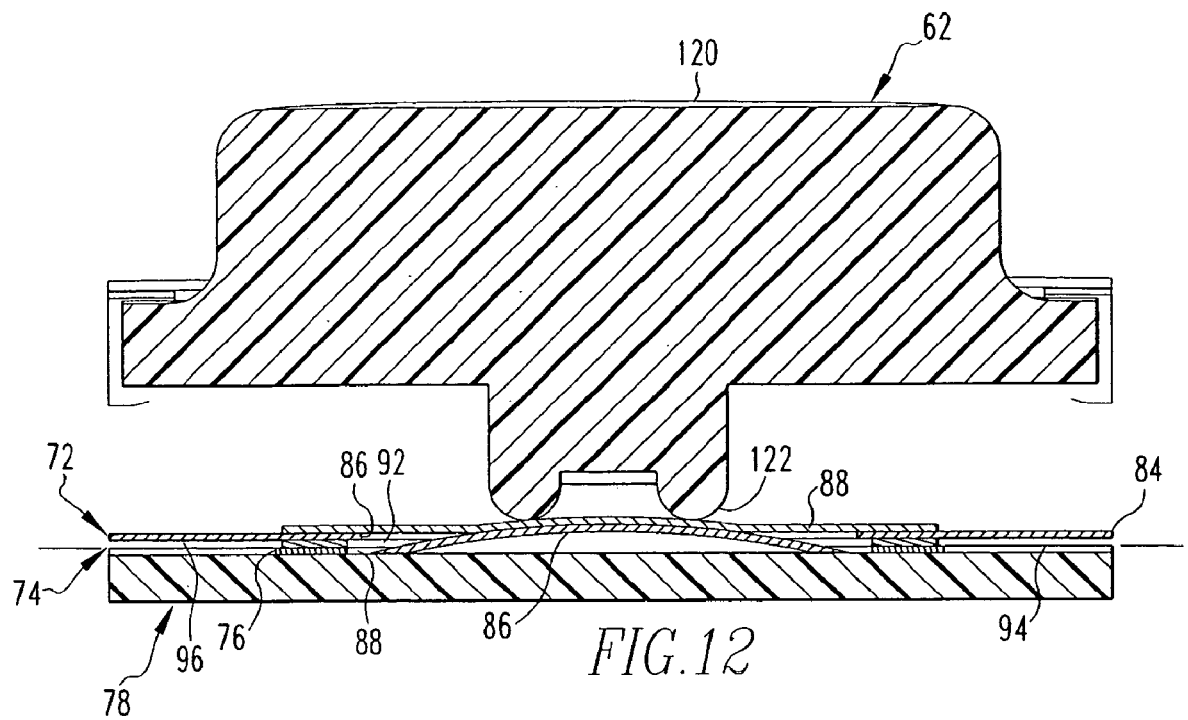
FIG. 12 is a sectional view depicting a key from the second set of the keyboard in an initial position.
Figure 13:
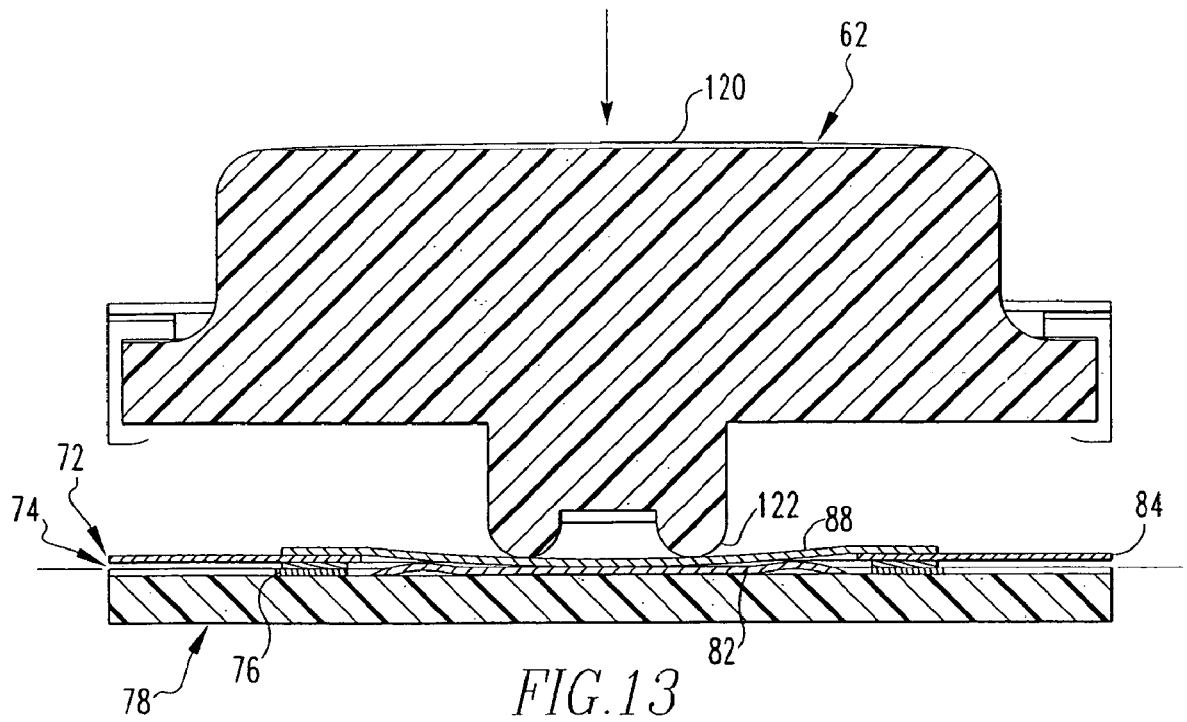
FIG. 13 is a view similar to FIG. 12, except depicting the key in the first terminal position.

As can be understood from FIGS. 12 and 13, each key 62 in the second set 60 is substantially similar to the keys 42 of the first set 40, except the keys 62 of the second set 60 are not disposed over a carbon patch 94 and do not include the second and third protrusions 124, 126 that are structured to engage the carbon patches 94. As each key 62 in the second set 60 is substantially similar to the keys 42 of the first set 40 like reference numbers will be used to describe the keys 62 of the second set 60. Thus, each key 62 in the second set 60 includes a finger plate 120 and a first protrusion 122 in the exemplary form of a hollow cylinder. The finger plate 120 is engageable by a user's finger and includes the indicia 34 (FIG. 2) disposed thereon. The first protrusion 122 extends outwardly away from the finger plate 120 which, in the exemplary embodiment, is opposite the indicia 34.

As can further be understood from FIG. 12, each key 62 is associated with one of the domes 82. In FIG. 12, the key 62 is in an initial position which corresponds with the relaxed position of the associated dome 82 and the relaxed. positions of the associated carbon patches 94. When the key 62 is depressed straight toward the printed circuit board 78, such as is depicted generally in FIG. 13, and which would correspond with a user pressing the key 62, the first protrusion 122 of the key 62 engages the dome 82 that is associated with the key 62 and elastically collapses the dome 82 to the deflected position. The key 62 in FIG. 13 is in the terminal position, and thus it can be seen that the key 62 is movable between the initial position and the terminal position.

When the dome 82 is in the deflected position, it contacts the ball contact 108 of the associated pair of primary contacts 102, The domes 82 are primary conductors which, when engaged with a corresponding set of primary contacts 102, electrically connect together the pair of primary contacts 102 in order to complete a circuit or to complete an open portion of a circuit, which provides a first function associated with the first terminal position of the key 62. The dome 82 is configured to "snap" when moving between the relaxed position (FIG. 8) and the deflected position (FIG. 9), and such a "snap" provides a desirable tactile feedback to the user.

It thus can he seen that each key 62 in the second set of keys 60 is movable between the initial position and a single terminal position. The single terminal position is associated with the three indicia 35, 36, 37 (FIG. 2) on the keys 62 and differentiation as to which indicia is selected by the user is determined by the processor 18 and the software 20 as described below.

As shown in FIG. 2, in one embodiment the first and second sets 40, 60 of keys are disposed in a grid having three rows and five columns. In this embodiment the first set 40 of keys includes the keys 42 located at the first row, second and fourth columns, the second row, first, third, and fifth columns, and the third row, second and fourth columns and the second set 60 of keys includes the keys 62 located at the first row, first, third, and fifth columns, the second row, second and fourth columns, and the third row, first, third, and fifth columns. To have the QWERTY pattern, the key in the first row and first column includes the letters "Q" and "W." The remaining keys 42, 62 generally have two letters of the alphabet thereon with the exceptions of the key 62 located at the second row, fourth column which has the single letter "J" thereon, and the key 62 at the third row, third column which has the single letter "B" thereon. In this configuration the key 62 located at the third row, fifth column does not have a letter associated with it and may he used as a function key, e.g. a "delete" and/or "backspace" key. Additionally, the "space" key is one of the keys in the third set 66 of keys preferably located below the first and second 40, 60 sets of keys. In this configuration, the first indicia 35, that is, the numbers, may be laid out in a centralized telephone keypad pattern. A telephone keypad pattern has a three by three grid for numbers one to nine and a single lower key for the zero key. The number one is located in the upper left of the grid. Thus, when disposed on the keyboard assembly 12 as shown in FIG. 2, the number one is on the key 42 located at the first row, second column. Further, the zero may be located on the "space" key.

In operation, the processor 18 utilizes the input from the keyboard assembly 12 to provide an output to the display 17. The speed of creating a message including text corresponding to the indicia 34 is enhanced by the disambiguation routine 21 and the input created by the primary conductors 89, the secondary conductors 96 and the tertiary conductors 97. The disambiguation routine 21 is structured to select likely letter combinations, i.e., letter combinations that create known words, as is known in the art. The functionality of the disambiguation routine 21 is enhanced by the additional input created by the secondary conductors 96 and the tertiary conductors 97. That is, the additional input of the secondary conductors 96 and the tertiary conductors 97 weights, or makes more likely, the selection by the processor 18 of the indicia 34 associated with either the secondary conductor 96 and the tertiary conductor 97.

For example, with the key pad 70 layout described above, the letters "U" and "I" are both located on a single key 42 in the first set 40. The letter "U" is located on the left side of the key 42 and above the secondary conductor 96 associated with that key 42. The letter "I" is located on the right side of the key 42 and above the tertiary conductor 97 associated with that key 42. That is, the "U/I" key is a key 42 structured to engage the secondary conductors 96 and the tertiary conductors 97 located on either side of the primary conductor 89. Additionally, the key 42 may also be associated with the number "3." Thus, this single key 42 has the first indicia 35 of the number "3", a second indicia 36 of the letter "U" and a third indicia 37 of the letter "L." For this example, this key 42 will be identified as the "3/U/I key."

By way of further example, assuming a user is beginning to create a message in the handheld electronic device and there are no prior inputs, when a user presses on the 3/U/I key 42, the processor 18 will provide an output to the display 17. When the user moves the 3/U/I key 42 to the first terminal position only the primary conductor 89 is engaged. The disambiguation routine 21 may be adapted to associate this position with the number "3" and the processor 18 will cause the number "3" to be presented on the display 17. If, however, the 3/U/I key 42 is moved into the second terminal position, the primary conductor 89 and the secondary conductor 96 are engaged and the disambiguation routine 21 will weigh the letter "U" as a more likely choice. Thus, the processor 18 will cause the letter "U" to be presented on the display 17. Similarly, if the "3/U/I" key 42 is moved. into the third terminal position, the primary conductor 89 and the tertiary conductor 97 are engaged and the disambiguation routine 21 will weigh the letter "I" as a more likely choice. Thus, the processor 18 will cause the letter "I" to be presented on the display 17.

The processor 18 may also he adapted to display the alternate choices. That is, if the user moves the 3/U/I key 42 to the first terminal position, the number "3" may be displayed as a first of three choices and the letters "U" and "I" may be displayed as alternative choices. As is known in the art, the user could use the dial 19 to provide an input to the processor 18 indicating the alternate choices are desired. Typically, this is accomplish by having a display 17 show a indication, e.g., a highlight, associated with one of the choices, either "3," "U," or "I." As the dial 1.9 is rotated, the highlight moves between the choices and the user selects the desired. choice by engaging another key, typically the "enter" key.

Additionally, as is known in the art, the disambiguation routine 21 is adapted to provide a list of frequent character choices on the display based on combinations of input from the keys 32. For example, a user initially selects the letter "Q." That is, the user depressed the "Q/W" key and, as "W" is a more commonly used letter, the disambiguation routine 21 would display the letter "W" with the letter "Q" as an alternate choice. The user then would use the dial 19, or another selection device, to choose the letter "Q" as the desired choice. Having selected the letter "Q", the next key pressed is the "3/U/I" key 42. At this point, the disambiguation routine 21 is likely to suggest the letter combination of "QU" regardless of which terminal position the "3/U/I" key 42 is in as the letter "Q" is almost always followed by the letter "U". Similarly, if the prior character is a number and the "3/U/I" key 42 is pressed, the disambiguation routine 21 will suggest the number "3" regardless of which terminal position the "3/U/I" key 42 is in because very few common words incorporate numerical characters and, with the exception of variables in mathematical expressions, few numbers include letters. Again, the processor 18 may also be adapted to display the alternate choices which may be selected using the dial 19.

Figure 14:
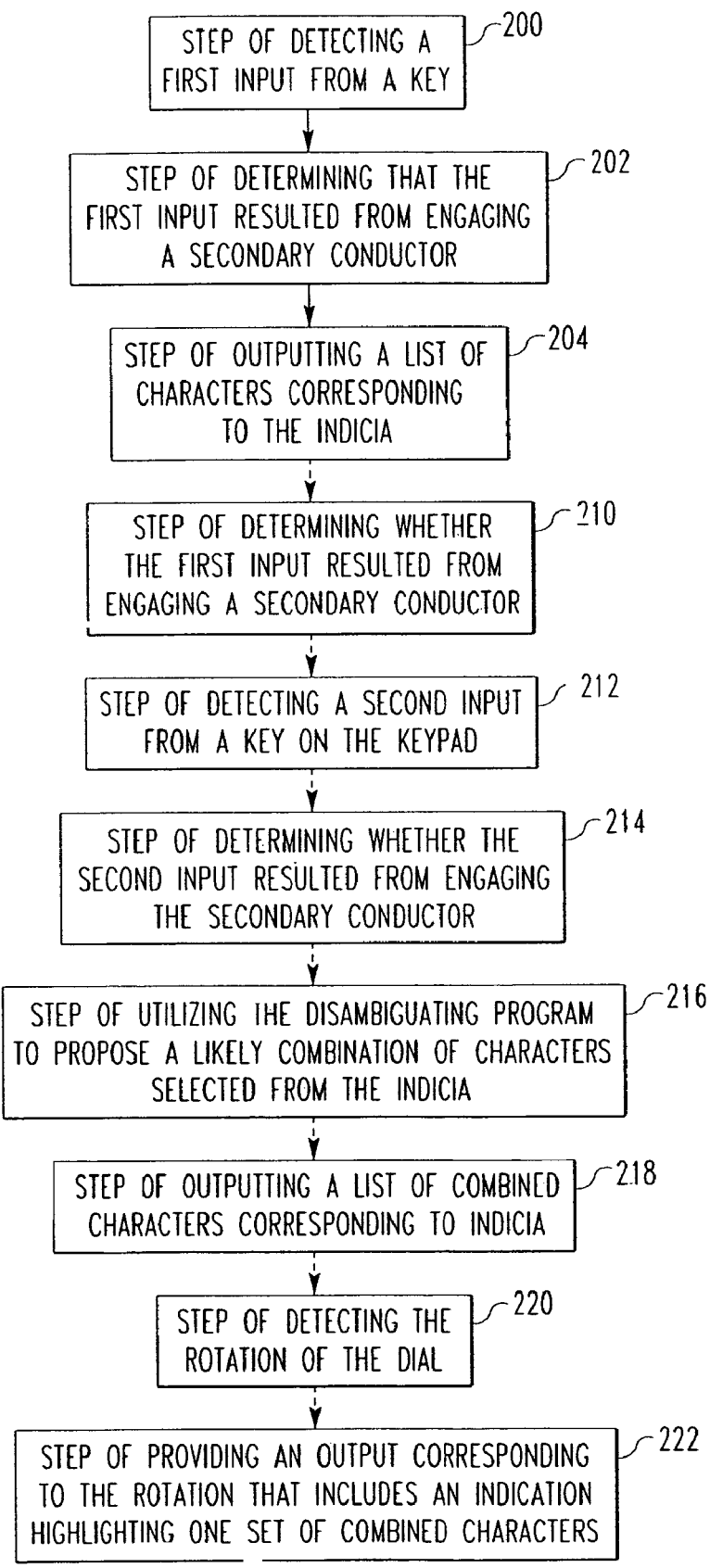
FIG. 14 is a flow chart showing the steps of the disclosed method.

Therefore, the method of using the handheld electronic device 10 described above, and as shown in FIG. 14 would include the steps of detecting 200 a first input from a key 32 on the keypad 70, determining 202 that the first input resulted from engaging a secondary conductor 96, and outputting 204 a list of characters corresponding to the indicia 34 on the selected key 32 and, where a secondary conductor 96 was engaged, favoring outputting the character corresponding to the indicia 34 associated with the secondary conductor 96 by placing the character corresponding to the indicia 34 associated with the secondary conductor 96 at a location in the output corresponding with a greater frequency or priority, at the top of the list.

When the user engages a sequence of keys 32, the method includes the following steps as well. First, determining 210 whether the first input resulted from engaging a secondary conductor 96 and if so, assigning additional weight to the character corresponding to the indicia 36 associated with the secondary conductor 96. Second, detecting 212 a second input from a key 32 on the keypad 70. Third, determining 214 whether the second input resulted from engaging the secondary conductor 96 and, if so, assigning additional weight to the character corresponding to the indicia 36 associated with the secondary conductor 96. Fourth, utilizing 216 the disambiguation routine 21 to propose a likely combination of characters selected from the indicia disposed on the first and second input keys 32. Where either, or both, the first and second input resulted from engaging the secondary conductor 96, the proposal is weighted to favor a combination including the character corresponding to the indicia 36 associated with the at least one secondary conductor 96. Fifth, Outputting 218 a list of combined characters corresponding to indicia 34 disposed on the first and second input keys 32 and, where a secondary conductor 96 was engaged, favoring outputting the characters indicia 36 corresponding to the indicia associated with the at least one secondary conductor 96 by placing the combination of characters corresponding to the indicia 36 associated with the at least one secondary conductor 96 on the top of the list. Where the handheld electronic device 10 includes a dial 19 structured to provide a selective output, the method may include the further steps of detecting 220 the rotation of said dial 19 and providing 222 an output corresponding to the rotation that includes an indication highlighting one set of combined characters on the list.

Figure 15:
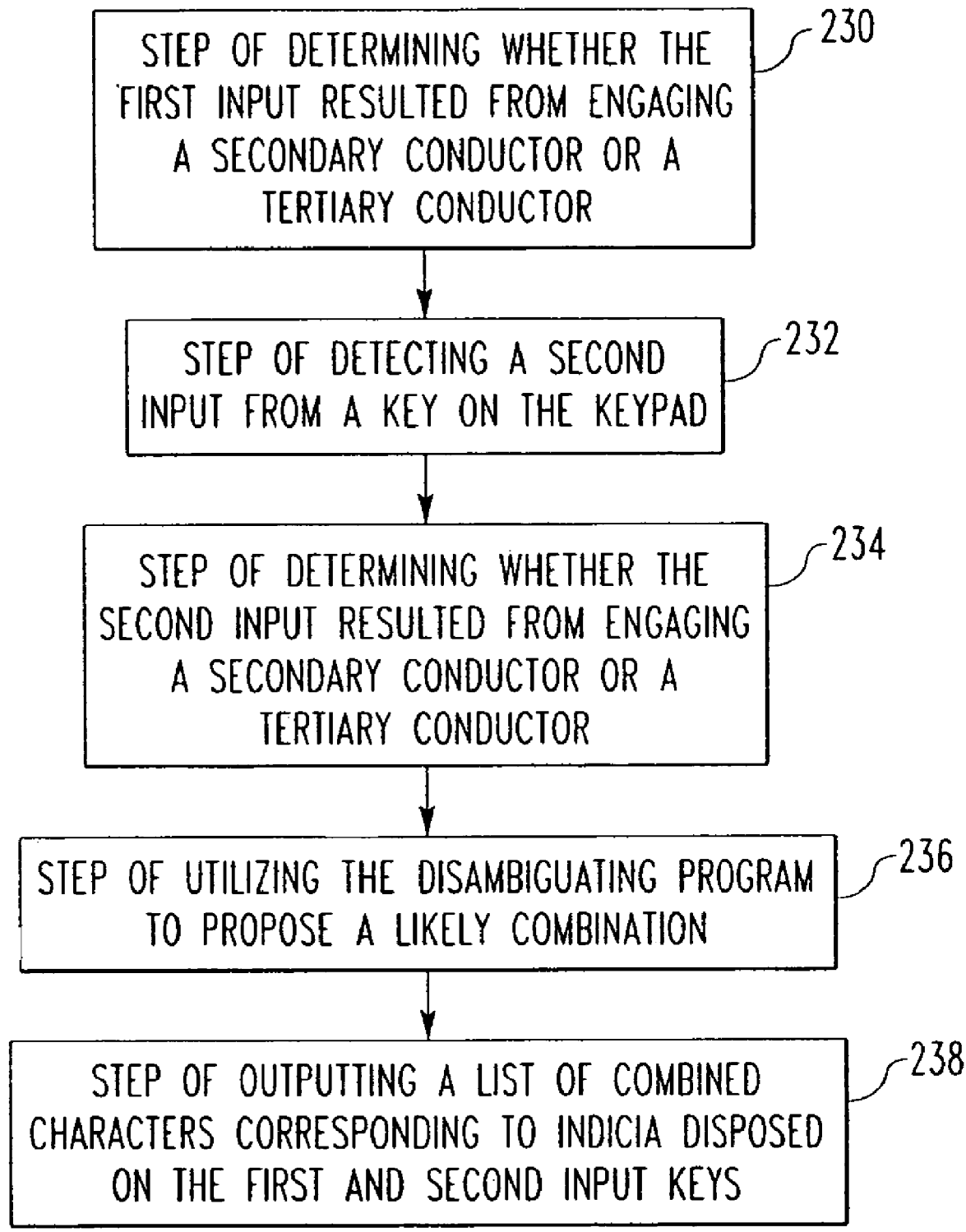
FIG. 15 is a flow chart showing additional steps of the disclosed method.

Additionally, as the first set 40 of keys 42 are preferably structured to engage a tertiary conductor 97 as well, as shown in FIG. 15, the method may he said to include the additional following steps. First, determining 230 whether the first input resulted from engaging a secondary conductor 96 or a tertiary conductor 97 and, if so, assigning additional weight to the character corresponding to the indicia associated with the secondary conductor 96 or the tertiary conductor 97. Second, detecting 232 a second input from a key 32 on the keypad 70. Third, determining 234 whether the second input resulted from engaging a secondary conductor 96 or a tertiary conductor 97 and, if so, assigning additional weight to the character corresponding to the indicia 36, 37 associated with the secondary conductor 96 or the tertiary conductor 97. Fourth, utilizing 236 the disambiguation routine 21 to propose a likely combination of characters selected from the indicia 36, 37 disposed on the first and second input keys 32 and, where either, or both, the first and second input resulted from engaging a secondary conductor 96 or tertiary conductor 97, the proposal is weighted to favor a combination including the indicia 36, 37 associated with the secondary conductor 96 or tertiary conductor 97. Fifth, outputting 238 a list of combined characters corresponding to indicia 36, 37 disposed on the first and second input keys 32 and, where a secondary conductor 96 or tertiary conductor 97 was engaged, favoring outputting the character corresponding to the indicia 36, 37 associated with the secondary conductor 96 or tertiary conductor 97 by placing the combination of characters corresponding to the indicia 34 associated with the secondary conductor 96 or tertiary conductor 97 on the top of the list.

Figure 16:
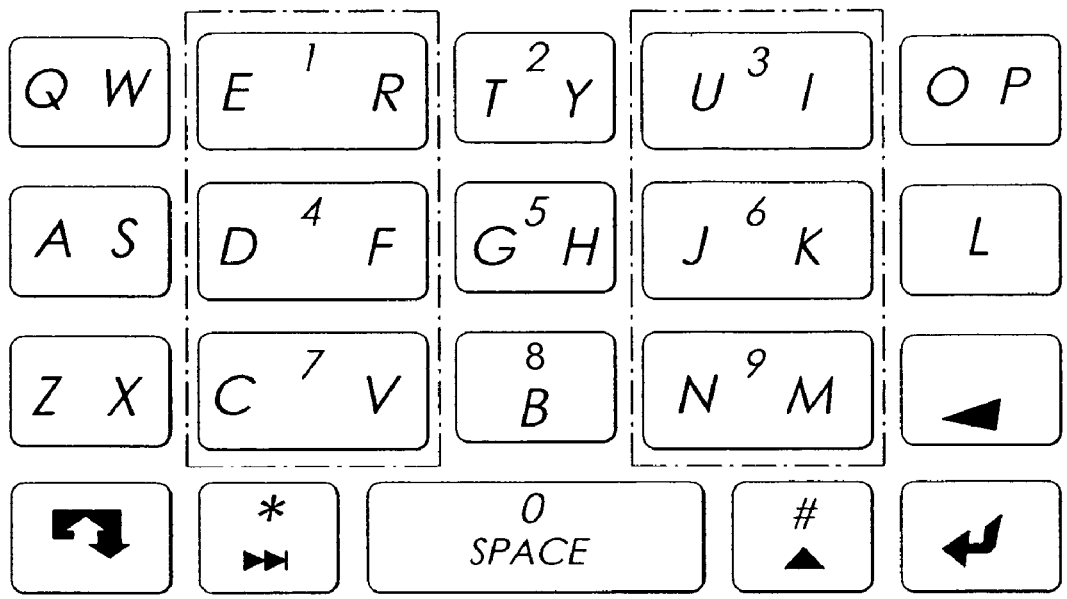
FIGS. 16 and 17 show alternative keyboard assembly layouts.
Figure 17:
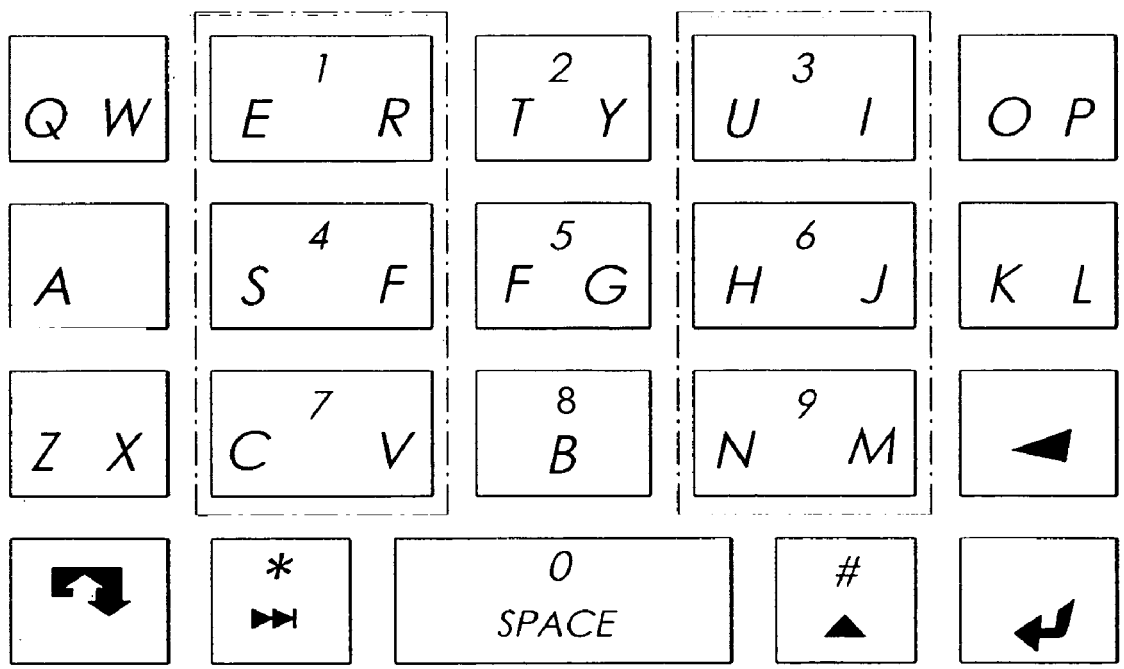

While specific embodiments of the invention have been described in detail, it will be appreciated by those skilled in the art that various modifications and alternatives to those details could be developed in light of the overall teachings of the disclosure. For example, as shown in FIGS. 16 and 17, the keys 32 may be disposed in rows and columns and said first set 40 of keys 42 are all disposed in two said columns As with the layout shown in FIG. 2, each of these keyboard assembly 12 layouts may have a reduced width due to the fact that only selected keys 32 are elongated. Accordingly, the particular arrangements disclosed are meant to be illustrative only and not limiting as to the scope of invention which is to be given the full breadth of the claims appended and any and all equivalents thereof

The invention claimed is:
1. A method of enabling input into an electronic device comprising:
    detecting a first input from a first key, having a plurality of indicia, a primary conductor, and a secondary conductor associated therewith;
    determining whether the first input is based on the secondary conductor associated with one of the plurality of indicia on the first key;
    outputting a list of characters corresponding to indicia on the first key, wherein the one of the plurality of indicia associated with the secondary conductor is placed first in the list of characters, when it is determined that the first input is based the secondary conductor.
2. The method as recited in claim 1, further comprising:
    detecting rotation of a dial;
    providing an output corresponding to said rotation that includes an indication highlighting one of combined characters on the list.
3. The method as recited in claim 1, further comprising executing a disambiguation routine on a processor of the electronic device.
4. The method as recited in claim 3, wherein when it is determined that the first input is based on the secondary conductor, the disambiguation routine assigns additional weight to the indicia corresponding to the indicia associated with the secondary conductor of the first key.

5. The method as recited in claim 3, further comprising
detecting a second input from a second key having a plurality of indicia, a primary conductor, and a secondary conductor associated therewith;
determining whether the second input is based on the secondary conductor associated with one of the plurality of indicia on the second key;
assigning additional weight to the one of a plurality of indicia on the second key, when it was determined that the second input is based on the secondary conductor of the second key.

6. The method as recited in claim 5, further comprising
utilizing the disambiguation routine to propose a likely combination of characters selected from the plurality of indicia of the first and second input keys;
outputting a list of combined characters weighted to include characters corresponding to the indicia associated with the secondary conductor of the first key and second key, when the first input is based on the secondary conductor of the first key and the second input is based on the secondary conductor of the second key.

7. The method as recited in claim 6, further comprising:
detecting rotation of a dial;
providing an output corresponding to said rotation that includes an indication highlighting one set of combined characters on the list.

8. The method as recited in claim 5, further comprising
utilizing the disambiguation routine to propose a likely combination of characters selected from the plurality of indicia of the first and second input keys;
outputting a list of combined characters weighted to include characters corresponding to the indicia associated with the secondary conductor of the first key, when the first input is based on the secondary conductor of the first key.

9. The method as recited in claim 8, further comprising:
detecting rotation of a dial;
providing an output corresponding to said rotation that includes an indication highlighting one set of combined characters on the list.

10. The method as recited in claim 5, further comprising
utilizing the disambiguation routine to propose a likely combination of characters selected from the plurality of indicia of the first and second input keys;
outputting a list of combined characters weighted to include characters corresponding to the indicia associated with the secondary conductor of the second key, when the second input is based on the secondary conductor of the second key.

11. The method as recited in claim 10, further comprising:
detecting rotation of a dial;
providing an output corresponding to said rotation that includes an indication highlighting one set of combined characters on the list.

12. The method as recited in claim 1, further comprising:
determining whether the first input is based on electrical connection of a tertiary conductor of the first key, wherein the tertiary conductor corresponds to indicia of the first key.

13. The method as recited in claim 12, further comprising executing a disambiguation routine on a processor of the electronic device.

14. The method as recited in claim 13, further comprising
assigning additional weight to a character corresponding to indicia associated with the secondary conductor or the tertiary conductor, when it has been determined that the first input resulted from one of the secondary conductor or tertiary conductor.

15. The method as recited in claim 13, further comprising
detecting a second input from a second key having a plurality of indicia, a primary conductor, a secondary conductor, and a tertiary conductor associated therewith;
determining whether the second input is based on the secondary conductor or the tertiary conductor each associated with one of the plurality of indicia on the second key;
assigning additional weight to the one of a plurality of indicia on the second key, when it was determined that the second input is based on one of the secondary conductor or the tertiary conductor of the second key.

16. The method as recited in claim 15, further comprising
utilizing the disambiguation routine to propose a likely combination of characters selected from the plurality of indicia of the first and second input keys;
outputting a list of combined characters weighted to include characters corresponding to the indicia associated with the secondary conductor or the tertiary conductor of the first key and second key, when the first input is based on the secondary conductor or the tertiary conductor of the first key and the second input is based on the secondary conductor or tertiary conductor of the second key.

17. The method as recited in claim 15, further comprising
utilizing the disambiguation routine to propose a likely combination of characters selected from the plurality of indicia of the first and second input keys;
outputting a list of combined characters weighted to include characters corresponding to the indicia associated with the secondary conductor or the tertiary conductor of the first key, when the first input is based on the secondary conductor or the tertiary conductor of the first key.

18. The method as recited in claim 15, further comprising
utilizing the disambiguation routine to propose a likely combination of characters selected from the plurality of indicia of the first and second input keys;
outputting a list of combined characters weighted to include characters corresponding to the indicia associated with the secondary conductor or the tertiary conductor of the second key, when the second input is based on the secondary conductor or tertiary conductor of the second key.

* * * * *